United States Patent Office 3,370,062
Patented Feb. 20, 1968

3,370,062
PROCESS FOR PRODUCING
PENTACHLOROPYRIDINE
John Anthony Corran, Runcorn, England, assignor to Imperial Chemical Industries Limited, London, England, a corporation of Great Britain
No Drawing. Filed Feb. 1, 1965, Ser. No. 429,607
Claims priority, application Great Britain, July 10, 1964, 5,895/64
10 Claims. (Cl. 260—290)

This invention relates to the manufacture of ring-substituted pyridines and more particularly to the manufacture of chlorinated pyridines by chlorination in the vapour phase.

The availability of poly-chlorinated pyridines has hitherto been limited by the relative inconvenience and inefficiency of known methods of introducing more than two chlorine atoms as substituents in the pyridine ring.

Poly-chlorinated pyridines have previously been obtained in liquid-phase reactions using, for example, excess phosphorus pentachloride, but reaction times have been long, yields have been low and such methods have not lent themselves to large-scale operation.

We have now found that high yields of products containing one or more chlorine atoms as substituents in the pyridine ring may be obtained when a vapour-phase chlorination process is carried out using more than two moles of chlorine per mole of pyridine or substituted pyridine. The process is especially advantageous for the preparation of products containing more than two chlorine atoms in the pyridine ring but products containing one or two chlorine atoms in the pyridine ring may also be formed in substantial proportions.

Thus according to the present invention there is provided a process for the manufacture of substituted pyridines containing one or more chlorine atoms as substituents in the pyridine ring which comprises interacting pyridine or a substituted pyridine with chlorine in the vapour phase at elevated temperature, the proportion of chlorine in the reactants being more than two moles of chlorine per mole of pyridine or substituted pyridine.

The process according to the present invention is especially applicable to the vapour-phase chlorination of pyridine itself, in which case high yields of pentachloropyridine may be obtained.

Suitable substituted pyridines which may be used as starting materials include alkyl-substituted pyridines, for example methylpyridines, and halogenopyridines containing one or more halogen atoms in the pyridine nucleus, for example chloropyridines.

In general, suitable proportions of chlorine are from 2.5 to 6 moles of chlorine per mole of pyridine or substituted pyridine. In the preparation of pentachloropyridine from pyridine itself or from substituted pyridines it is preferred to use more than 6 moles of chlorine per mole of pyridine or substituted pyridine.

In general, preferred reaction temperatures are those in the range 200° C. to 550° C., for example in the range 300° C. to 400° C. In the preparation of pentachloropyridine from pyridine itself or from a substituted pyridine, the preferred reaction temperatures are those in the range 400° C. to 500° C.

The reactants may be diluted with inorganic diluents, for example nitrogen and/or steam, or with organic diluents, preferably inert towards chlorine, for example carbon tetrachloride.

It is preferred to carry out the reaction in the presence of a porous material, for example silica, alumina or carbon. It is especially preferred to carry out the reaction in the presence of silica, alumina or a mixture or combination thereof.

The porous material may be used in the form of either a static bed or a fluidised bed. It is preferred to use a fluidised bed of silica or of a silica-alumina. It is especially preferred to use microspheroidal silica having physical characteristics appropriate to fluidised bed operation.

Convenient residence times of the mixture in the reaction zone are, for example, between 2 and 20 seconds, but higher or lower residence times may also be used.

It is preferred to pre-heat separately the feed of chlorine and the feed of pyridine or substituted pyridine. In fluidised bed operation it is convenient to introduce all or part of the chlorine feed separately into the fluidised bed so that the mixing of the chlorine with the pyridine or substituted pyridine occurs within the bed.

The pyridine or substituted pyridine is conveniently vapourised in a stream of diluent vapour which serves as a carrier gas.

Pyridine or substituted pyridines may be used in the form of the substantially pure materials or in the form of mixtures containing one or more of the desired starting materials.

Products containing more than two chlorine atoms as substituents in the pyridine ring may be isolated from the reaction products by known techniques such as fractional distillation, solvent extraction or combinations of such techniques. When the reaction products contain mono- and di-chloropyridines, these may also be isolated by known techniques if desired.

Certain chlorinated pyridines and their derivatives show fungicidal, pesticidal or herbicidal activity.

The invention is illustrated but not limited by the following examples.

*Example 1*

Pyridine was vaporised in a stream of nitrogen and continuously mixed with gaseous chlorine. The resultant mixture, containing 3.6 moles of chlorine and 0.3 mole of nitrogen per mole of pyridine, was passed through a bed of 103 grams of "Farnell" coconut charcoal, 5–14 mesh B.S.S. The flow-rate of chlorine was 1.2 moles per hour. The major portion of the bed of charcoal was maintained at 300° C., the highest temperature reached in any part of the bed being 450° C.

The flow was continued for 2¼ hours. At the end of this period 125 grams of reaction products, partly crystalline at room temperature, had been condensed from the effluent mixture. The crude product was mixed with water and the mixture was subjected to extraction with chloroform. The chloroform extract was washed with sodium bicarbonate solution and dried over anhydrous sodium sulphate. On evaporation of the chloroform 112 grams of a white solid remained, which on recrystallisation from aqueous ethanol yielded 43 grams of product in the form of colourless plates, melting point 126° C. Analysis of the product showed that it contained (by weight) 23.8% carbon, less than 0.2% hydrogen, 5.8% nitrogen and 70.1% chlorine; the molecular weight was 235. ($C_5Cl_5N$ requires 23.8% carbon, 5.8% nitrogen, 70.7% chlorine, molecular weight 251.5.)

The mother liquors from the recrystallisation contained further quantities of chlorinated products. The aqueous residue from the chloroform extraction also contained some chlorinated products.

*Example 2*

Pyridine was vaporised in a stream of nitrogen and continuously mixed with pre-heated gaseous chlorine within a fluidised bed of 110 grams of "Sorbsil U. 30" (a microspheroidal silica, particle size 100–300μ, surface area approximately 500 m.² per gram), contained in a glass tube 3 cm. in diameter. ("Sorbsil" is a trade-name.) The depth of the fluidised bed was approximately 31 cm. The temperature of the bed was maintained at 500° C. while the reaction mixture, containing 5.3 moles of chlorine and 1.5 mole of nitrogen per mole of pyridine, was passed through the bed at a rate equivalent to a flow-rate of chlorine of 1.2 mole per hour.

The reaction products were collected by condensation. After 12½ hours' flow 288 grams of crude solid product were obtained. The crude product was dissolved in trichloroethylene and the solution was filtered; the filtrate was washed with sodium bicarbonate solution and with water, and then dried over anhydrous sodium sulphate. The trichloroethylene was then removed from the product by distillation and the residual products were distilled at atmospheric pressure. The successive fractions obtained were (a) 4 grams of product boiling in the range 220° C.–250° C. (b) 93 grams of product boiling in the range 250° C.–275° C., comprising pentachloropyridine together with lower chlorinated derivatives; (c) 80 grams of product boiling in the range 275° C.–280° C. comprising substantially pure pentachloropyridine.

The pentachloropyridine fraction boiling in the range 275° C.–280° C. solidified to a colourless solid, melting point 123° C.–125° C.; recrystallisation from ethanol gave crystals in the form of plates, melting-point 126° C.–127° C. Further quantities of pentachloropyridine were obtained by redistillation of the fraction boiling at 250° C.–275° C.

*Example 3*

Pyridine was vaporised in a stream of nitrogen and continuously mixed with pre-heated gaseous chlorine within a fluidised bed of 110 grams of "Sorbsil U. 30." The temperature of the bed was maintained at 500° C. while the reaction mixture, containing 8.1 moles of chlorine and 1.7 moles of nitrogen per mole of pyridine, was passed through the bed at a rate equivalent to a flow-rate of chlorine of 1.6 mole per hour.

After 18½ hours' flow, 611.5 grams of crude solid product were obtained. The crude product was dissolved in chloroform and the solution was filtered; the filtrate was washed with sodium bicarbonate solution and with water and then dried over anhydrous sodium sulphate. Chloroform was removed by distillation until a small volume of solution remained and then ethanol (1 litre) was added.

Substantially pure pentachloropyridine (446 grams, melting point 126°–127° C.) separated from the solution and an impure second portion of pentachloropyridine (17.5 grams) was obtained on evaporation of part of the solvent from the mother-liquor.

*Example 4*

The procedure of Example 3 was repeated except that the reaction mixture contained 3.7 moles of chlorine and 1 mole of nitrogen per mole of pyridine and that the temperature of the bed was maintained at 400° C.

The reaction products were collected by condensation. After 14 hours' flow, 465 grams of crude solid product were obtained. The crude product was dissolved in chloroform and the solution was filtered; the filtrate was washed with sodium bicarbonate solution and with water, and then dried over anhydrous sodium sulphate. The chloroform was then removed from the product by distillation and the residual products were distilled at atmospheric pressure. The main fractions obtained were (a) 108 grams of product boiling in the range 178–208° C.; this fraction contained 42.8% Cl and contained 2-chloropyridine together with mixed dichloropyridines.

(b) 139 grams of product boiling in the range 208–215° C.; this fraction contained 51.4% Cl and the main constituent was 2,6-dichloropyridine.

(c) 36 grams of product boiling in the range 221–245° C.; this fraction contained trichloropyridines. The higher-boiling residue, containing tetra-chloropyridines, weighed 38 grams.

*Example 5*

2-methylpyridine was vaporised in a stream of nitrogen and continuously mixed with pre-heated chlorine within a fluidised bed of 110 grams of "Sorbsil U 30." The temperature of the bed was maintained at 500° C. while the reaction mixture, containing 10 moles of chlorine and 1.8 moles of nitrogen per mole of 2-methylpyridine, was passed through the bed at a rate equivalent to a flow-rate of chlorine of 1.8 mole per hour.

After 5 hours' flow, 76 grams of crude solid product were obtained. The crude product was dissolved in chloroform, washed with sodium bicarbonate solution and with water, and then dried over anhydrous sodium sulphate. The chloroform was removed from the dried solution by distillation and the residue was crystallised from ethanol to yield 38 grams of substantially pure pentachloropyridine (melting point 126° C.).

*Example 6*

2-chloropyridine was vaporised in a stream of nitrogen and continuously mixed with pre-heated chlorine within a fluidised bed of 110 grams of "Sorbsil U. 30." The temperature of the bed was maintained at 500° C. while the reaction mixture, containing 8.5 moles of chlorine and 1.3 moles of nitrogen per mole of 2-chloropyridine was passed through the bed at a rate equivalent to a flow-rate of chlorine of 1.7 mole per hour.

The crude product obtained after 5 hours' flow was treated as described in Example 5 to yield 176 grams of substantially pure pentachloropyridine.

*Example 7*

A mixture of pyridine and carbon tetrachloride was vaporised in a stream of nitrogen and continuously mixed with pre-heated chlorine within a fluidised bed of 110 grams of "Sorbsil U. 30." The temperature of the bed was maintained at 500° C. while the reaction mixture, containing 9 moles of chlorine, 2 moles of carbon tetrachloride and 1 mole of nitrogen per mole of pyridine, was passed through the bed at a rate equivalent to a flow-rate of chlorine of 1.5 moles per hour.

The crude product obtained after 3 hours' flow was treated as described in Example 5 to yield 98.5 grams of substantially pure pentachloropyridine.

What I claim is:

1. A process for the manufacture of pentachloropyridine which comprises passing a mixture of chlorine and a pyridine selected from the group consisting of pyridine itself, methylpyridines and chloropyridines containing fewer than 5 chlorine atoms, in the vapor phase through a bed of porous material selected from the group consisting of silica, alumina and mixtures thereof at a temperature between 400° C. and 550° C., the mole ratio of the chlorine to the said pyridine being more than about 6:1.

2. A process according to claim 1 wherein the starting material comprises pyridine itself.

3. A process as claimed in claim 1 wherein the reaction is carried out in the presence of a diluent.

4. A process as claimed in claim 3 wherein the diluent is nitrogen.

5. A process as claimed in claim 3 wherein the diluent is carbon tetrachloride.

6. A process as claimed in claim 1 wherein the reaction is carried out in a fluidised bed of microspheroidal silica.

7. A process as claimed in claim 1 wherein the feed of chlorine and the feed of said pyridine are separately pre-heated.

8. A process as claimed in claim 1 wherein all or part of the chlorine feed is introduced into the fluidised bed separately from the feed of said pyridine.

9. A process as claimed in claim 1 wherein the residence time of the mixture in the reaction zone is between 2 and 20 seconds.

10. The process of claim 1 wherein the said bed of porous material is a fluidised bed.

References Cited

UNITED STATES PATENTS

| | | | |
|---|---|---|---|
| 2,820,791 | 1/1958 | Shermer | 260—290 |
| 3,251,848 | 5/1966 | Taplin | 260—290 |
| 3,153,045 | 10/1964 | Thomas | 260—290 |

OTHER REFERENCES

Wibaut et al., Rec. Trav. Chim 58 (1939), pp. 709–721.

Houben-Wehl, Meth. Org. Chemie 5/3, Verlog 1962, pp. 727–728.

JOHN D. RANDOLPH, *Primary Examiner.*

WALTER A. MODANCE, *Examiner.*

A. L. ROTMAN, *Assistant Examiner.*